United States Patent
Dane et al.

(10) Patent No.: US 10,119,501 B2
(45) Date of Patent: *Nov. 6, 2018

(54) SYSTEMS AND METHODS FOR CONTROLLING EGR FLOW DURING TRANSIENTS

(71) Applicant: Cummins Inc., Columbus, IN (US)

(72) Inventors: Marten H. Dane, Columbus, IN (US); Sudhanshu Talwar, Columbus, IN (US)

(73) Assignee: Cummins Inc., Columbus, IN (US)

( * ) Notice: Subject to any disclaimer, the term of this patent is extended or adjusted under 35 U.S.C. 154(b) by 158 days.

This patent is subject to a terminal disclaimer.

(21) Appl. No.: 15/139,140

(22) Filed: Apr. 26, 2016

(65) Prior Publication Data
US 2016/0252054 A1 Sep. 1, 2016

Related U.S. Application Data

(63) Continuation of application No. PCT/US2014/063804, filed on Nov. 4, 2014.

(60) Provisional application No. 61/899,498, filed on Nov. 4, 2013.

(51) Int. Cl.
| F02B 33/44 | (2006.01) |
| F02M 25/07 | (2006.01) |
| F02M 26/43 | (2016.01) |
| F02M 26/07 | (2016.01) |
| F02M 26/04 | (2016.01) |
| F02M 26/10 | (2016.01) |
| F01N 3/08  | (2006.01) |
| F02B 37/18 | (2006.01) |
| F02D 41/00 | (2006.01) |
| F02D 41/26 | (2006.01) |

(52) U.S. Cl.
CPC ........... *F02M 26/43* (2016.02); *F01N 3/0842* (2013.01); *F02B 37/18* (2013.01); *F02D 41/005* (2013.01); *F02D 41/26* (2013.01); *F02M 26/04* (2016.02); *F02M 26/07* (2016.02); *F02M 26/10* (2016.02)

(58) Field of Classification Search
CPC ........ F02M 26/43; F02M 26/04; F02M 26/07; F02M 26/10; F01N 3/0842; F02B 37/18; F02D 41/005; F02D 41/26
USPC .......................................... 60/605.2; 701/108
See application file for complete search history.

(56) References Cited

U.S. PATENT DOCUMENTS

| 3,884,200 A | 5/1975 | Caldwell |
| 6,763,708 B2 | 7/2004 | Ting et al. |
| 6,973,785 B2 | 12/2005 | Umehara et al. |
| 9,518,519 B2 * | 12/2016 | Dane ..................... F02M 26/43 |
| 2007/0193270 A1 | 8/2007 | Roozenboom et al. |
| 2011/0253098 A1 | 10/2011 | Pursifull et al. |
| 2012/0096927 A1 | 4/2012 | Freund |
| 2012/0204844 A1 | 8/2012 | Gingrich et al. |

(Continued)

OTHER PUBLICATIONS

International Search Report and Written Opinion, PCT/US2014/063804, dated Feb. 20, 2015, Cummins Inc., 16 pgs.

*Primary Examiner* — Thai Ba Trieu
(74) *Attorney, Agent, or Firm* — Taft Stettinius & Hollister LLP

(57) ABSTRACT

Systems, apparatus, and methods are disclosed that include a divided exhaust engine configured to control an EGR fraction in the charge flow to the cylinders in response to an EGR fraction overshoot condition, an exhaust pressure change in the EGR loop, and/or a transient operating condition.

23 Claims, 3 Drawing Sheets

(56) References Cited

U.S. PATENT DOCUMENTS

| | | |
|---|---|---|
| 2012/0204845 A1 | 8/2012 | Gingrich et al. |
| 2012/0285163 A1 | 11/2012 | Hayman et al. |
| 2012/0285427 A1 | 11/2012 | Hayman et al. |
| 2013/0081392 A1* | 4/2013 | Klingbeil ............... F02M 26/43 60/605.2 |
| 2014/0026565 A1* | 1/2014 | Peters .................... F02M 26/43 60/612 |
| 2015/0121851 A1* | 5/2015 | Dane ...................... F02M 26/43 60/274 |

* cited by examiner

SYSTEMS AND METHODS FOR CONTROLLING EGR FLOW DURING TRANSIENTS

CROSS-REFERENCE TO RELATED APPLICATION

The present application is a continuation of International Application No. PCT/US2014/063804, filed on Nov. 4, 2014, which claims the benefit of the filing date of U.S. Provisional Application Ser. No. 61/899,498 filed on Nov. 4, 2013, each of which are incorporated herein by reference in its entirety.

BACKGROUND

Engines operating with one or more cylinders as dedicated exhaust gas recirculation (EGR) cylinders enjoy greatly simplified controls and pressure management, fewer hardware devices, and other benefits. However, these simplifications come at the cost of a loss of control over the system, including a loss of control of the EGR fraction during low load and transient conditions. When nominal cylinders are dedicated to providing EGR, and standard fueling and controls are applied, the target EGR fraction in the charge flow provided by the cylinders is determined by the simple ratio of the number of EGR cylinders to the total number of cylinders. For example, an engine with one cylinder dedicated to EGR and four cylinders total will operate at a 25% EGR fraction if all of the cylinders are operated in the same manner.

However, during transient conditions the pressure of the charge flow in the intake manifold fold is able to change more rapidly than the pressure of the exhaust in the exhaust manifold of the dedicated EGR cylinder(s). As a result, the EGR fraction that is actually provided can increase significantly over the target EGR fraction during transient conditions. When the EGR fraction increases or deviates from its expected or target value, cylinder misfire and combustion instability can result. Therefore, further technological developments are desirable in this area.

SUMMARY

One embodiment is a unique system that includes a divided exhaust engine configured to control an EGR fraction in a charge flow to the cylinders of the engine in response to a transient condition that, for example, causes an increase in exhaust pressure in the EGR system and a deviation in the EGR flow from the expected EGR fraction. Other embodiments include unique methods, systems, and apparatus to control divided exhaust engines in response to an EGR fraction deviation condition.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
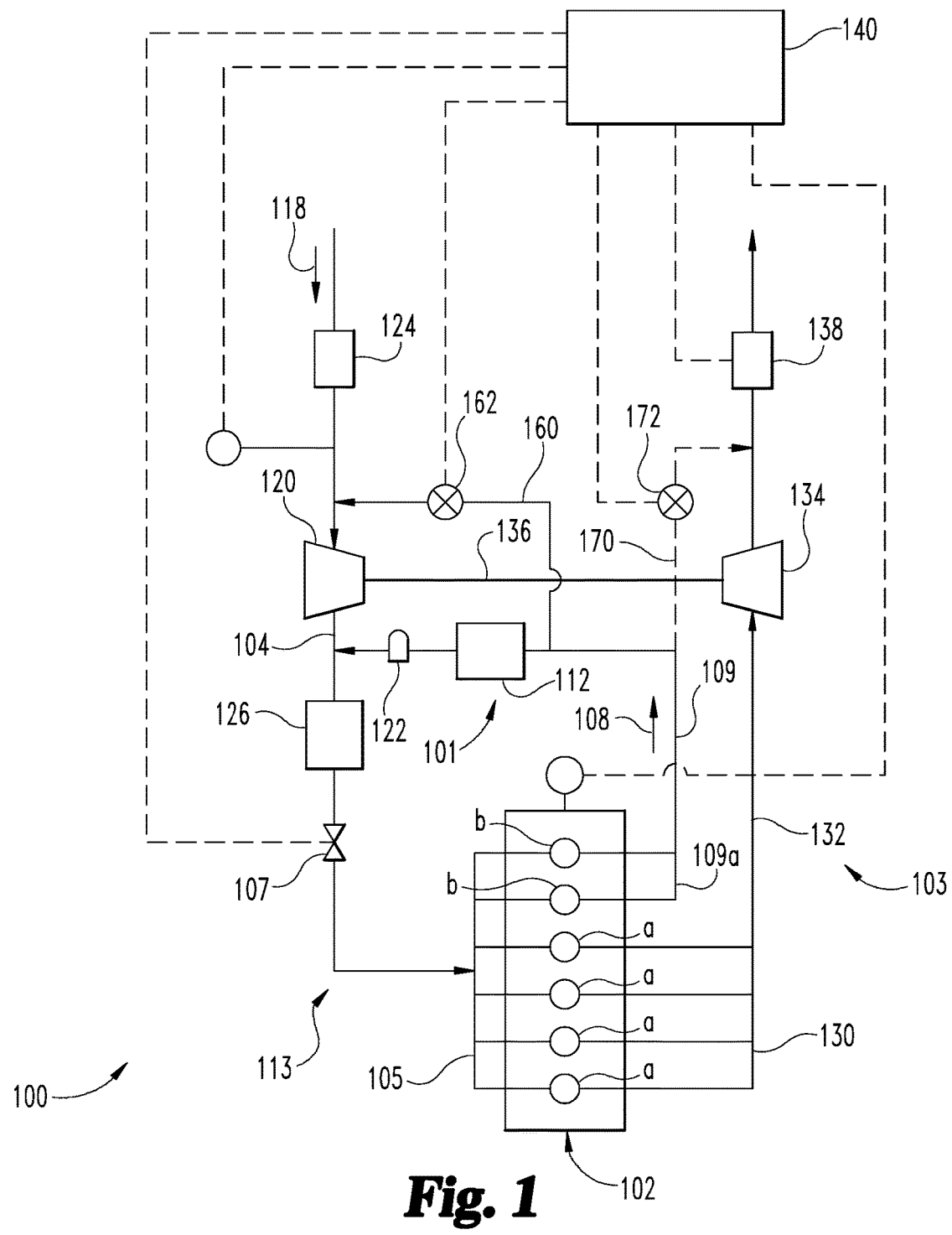
FIG. 1 is a schematic depiction of a system including an engine with an EGR system, an intake system and an exhaust system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, a system 100 is depicted having an engine 102. The engine 102 is an internal combustion engine of any type, and can include a stoichiometric engine, a gasoline engine, and/or a natural gas engine. In certain embodiments, the engine 102 includes a lean combustion engine such as a lean burn gasoline engine or a diesel cycle engine. In certain embodiments, the engine 102 may be any engine type producing emissions that may include an EGR system 101, for example to reduce $NO_x$ emissions from the engine 102. The engine 102 includes a number of cylinders a, b. The number of cylinders may be any number suitable for an engine, and the arrangement may be any suitable arrangement. The system 100 includes an in line 6 cylinder engine arrangement for illustration only and is not limited to such.

The engine 102 includes primary EGR cylinders b, and non-primary EGR cylinders a that do not provide any EGR flow in some arrangements and/or operating conditions. In certain embodiments, non-primary EGR cylinders a may provide secondary EGR flow in certain arrangements and/or operating conditions. The term primary EGR cylinder, as utilized herein, should be read broadly. Any EGR arrangement wherein, during at least certain operating conditions, the entire exhaust output of certain cylinders is recirculated to the engine intake is a primary EGR cylinder while the exhaust output of the remaining, non-primary EGR cylinders is provided to an exhaust system for outlet to atmosphere. A primary EGR cylinder typically, at least during EGR operation, includes exhaust divided from one or more of the remaining cylinders that are not primary EGR cylinders. However, the non-primary EGR cylinders a are not precluded from providing some exhaust gas recirculation during at least some operating conditions.

In the system 100, the EGR flow 108 recirculates in an EGR system 101 that includes an EGR passage 109 connected to combine EGR flow 108 with air intake flow 118 in an intake passage 104 at a position upstream of an intake manifold 105 of intake system 113. In another embodiment, EGR passage 109 is connected directly to intake manifold 105. Intake manifold 105 provides a charge flow including the intake flow 118 combined with EGR flow 108 to cylinders a, b. Intake manifold 105 is connected to intake passage 104, which can include an intake throttle 107 to regulate the charge flow or intake air flow to cylinders a, b. Intake passage 104 may also include a charge air cooler 126 to cool the charge flow provided to intake manifold 105. Intake system 110 may also include a compressor 120 in intake passage 104 to compress the intake flow 118 received from an intake air cleaner 124.

During nominal operating conditions, the EGR flow 108 may combine with the intake flow 118 downstream of compressor 120 at an outlet of a restriction formed by an accumulator or mixer 122 in EGR passage 109. In certain embodiments, the system 100 does not include a compressor or any other type of boost pressure generating device. The example intake system 113 includes an EGR cooler 112 in the EGR passage 109. In other embodiments, EGR passage 109 can include a bypass with a valve that selectively allows EGR flow to bypass the EGR cooler 112. In embodiments where EGR cooler 112 is present, EGR flow 108 may combine with intake flow 118 downstream of charge air cooler 126 and upstream of throttle 107. The presence of an EGR cooler 112 and/or an EGR cooler bypass is optional and non-limiting.

Non-primary EGR cylinders a are connected to an exhaust system 103 that includes an exhaust manifold 130 that receives exhaust gases from non-primary EGR cylinders a. Exhaust system 103 also includes an exhaust passage 132 that receives exhaust gas from exhaust manifold 130, a turbine 134 in exhaust passage 132 that is operable via the exhaust gases to drive compressor 120 via shaft 136, and an after treatment device 138 in exhaust passage 132 that includes one or more components configured to treat emissions in the exhaust gas. Turbine 134 can be a variable geometry turbine with an adjustable inlet, or include a wastegate to bypass exhaust flow. Other embodiments contemplate an exhaust throttle (not shown) in the exhaust system 103.

In certain embodiments, the system 100 includes a controller 140 structured to perform certain operations to control an EGR engine 102 with an EGR fraction provided by one or more primary EGR cylinders b. In certain embodiments, the controller 140 forms a portion of a processing subsystem including one or more computing devices having memory, processing, and communication hardware. The controller 140 may be a single device or a distributed device, and the functions of the controller 140 may be performed by hardware or by instructions encoded on computer readable medium. The controller 140 may be included within, partially included within, or completely separated from an engine controller (not shown). The controller 140 is in communication with any sensor or actuator throughout the system 100, including through direct communication, communication over a datalink, and/or through communication with other controllers or portions of the processing subsystem that provide sensor and/or actuator information to the controller 140.

In certain embodiments, the controller 140 is described as functionally executing certain operations. The descriptions herein including the controller operations emphasizes the structural independence of the controller, and illustrates one grouping of operations and responsibilities of the controller. Other groupings that execute similar overall operations are understood within the scope of the present application. Aspects of the controller may be implemented in hardware and/or by a computer executing instructions stored in non-transient memory on one or more computer readable media, and the controller may be distributed across various hardware or computer based components.

Example and non-limiting controller implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The listing herein of specific implementation elements is not limiting, and any implementation element for any controller described herein that would be understood by one of skill in the art is contemplated herein. The controllers herein, once the operations are described, are capable of numerous hardware and/or computer based implementations, many of the specific implementations of which involve mechanical steps for one of skill in the art having the benefit of the disclosures herein and the understanding of the operations of the controllers provided by the present disclosure.

One of skill in the art, having the benefit of the disclosures herein, will recognize that the controllers, control systems and control methods disclosed herein are structured to perform operations that improve various technologies and provide improvements in various technological fields. Without limitation, example and non-limiting technology improvements include improvements in combustion performance of internal combustion engines, improvements in emissions performance, after treatment system performance, engine torque generation and torque control, engine fuel economy performance, improved durability of exhaust system components for internal combustion engines, and engine noise and vibration control. Without limitation, example and non-limiting technological fields that are improved include the technological fields of internal combustion engines and related apparatuses and systems as well as vehicles including the same.

Certain operations described herein include operations to interpret or determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted or determined parameter can be calculated, and/or by referencing a default value that is interpreted or determined to be the parameter value.

Figure 2:
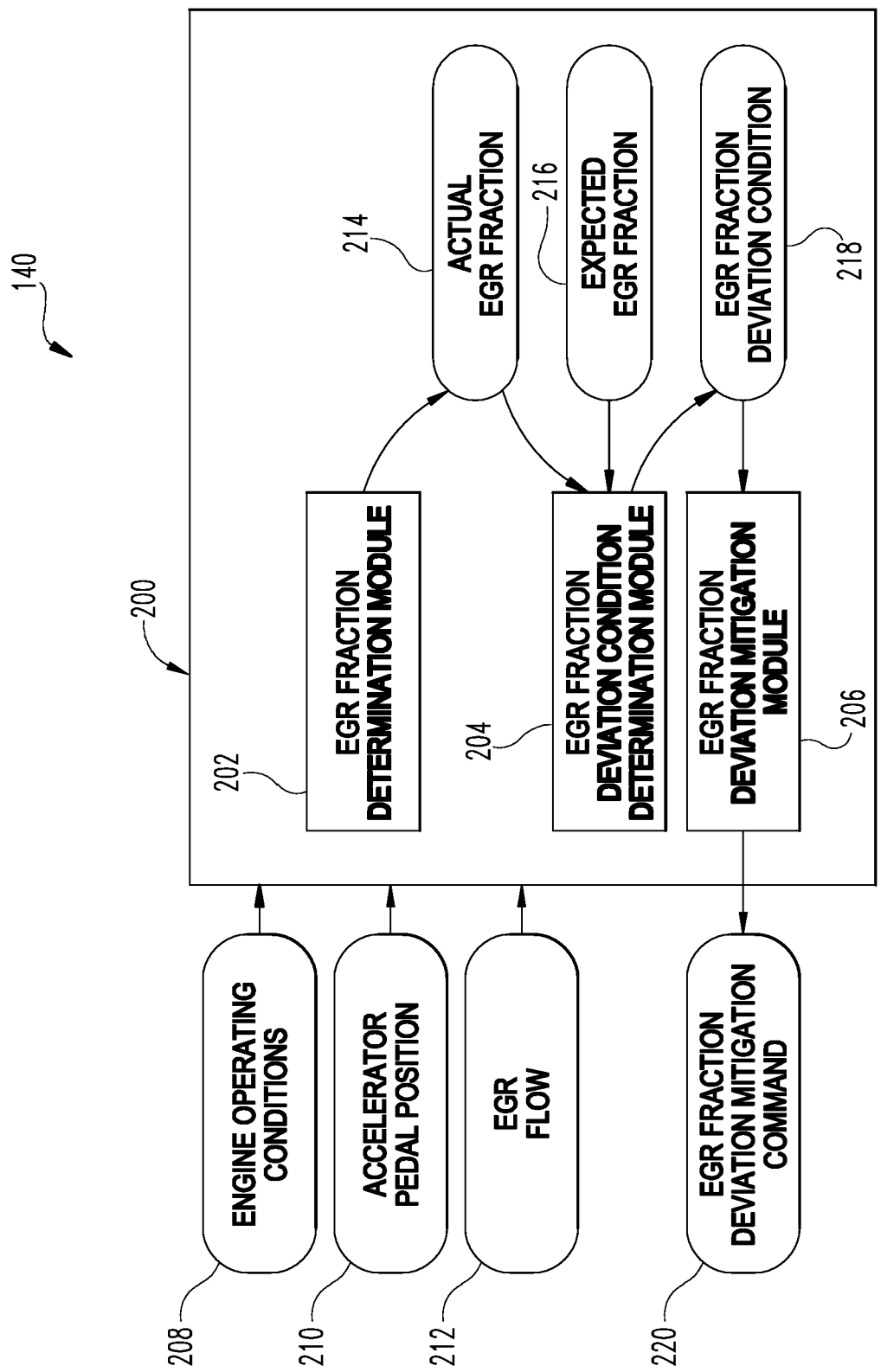
FIG. 2 is a schematic depiction of one embodiment of a controller apparatus for controlling EGR flow in response to a transient condition.

Certain systems are described following, and include examples of controller operations in various contexts of the present disclosure. Referring to FIG. 2, one embodiment of controller 140 including a controller apparatus 200 is shown. In certain embodiments, the controller apparatus 200 includes an EGR fraction determination module 202, an EGR fraction deviation condition determination module 204, and an EGR fraction deviation condition mitigation module 206. The presence of one or more of the modules 202, 204, 206 is non-limiting, and one or more modules 202, 204, 206 may be omitted and/or other modules may be provided.

In one embodiment, controller apparatus 200 receives or interprets a number of inputs, such as engine operating conditions 208, an accelerator pedal position 210, and an EGR flow 212. EGR fraction determination module 202 determines an actual EGR fraction 214 from one or more of the engine operating conditions 208, accelerator pedal position 210 and EGR flow 212. EGR fraction deviation condition determination module 204 interprets an actual EGR fraction 214 and a target or expected EGR fraction 216 and determines or outputs an EGR fraction deviation condition 218 in response to, for example, an EGR overshoot condition in which the actual EGR fraction 214 exceeds the expected EGR fraction 216.

EGR fraction deviation condition mitigation module 206 interprets the EGR fraction deviation condition 218 and in response provides an EGR fraction overshoot mitigation command 220. The EGR fraction deviation condition 218 can include, for example, an EGR fraction overshoot condition in which the actual EGR flow 212 will exceed or is exceeding the expected EGR fraction 216. The expected EGR fraction 216 indicates that portion of the total exhaust flow that is provided as EGR flow 108 by the primary EGR cylinders b when all cylinders a, b are operating in the same manner. For example, in a six cylinder engine with two primary EGR cylinders b, the EGR fraction is 33%. In one embodiment, the expected EGR fraction 216 varies in response to a deactivation or fueling cut-off to one or more of the primary EGR cylinders b, and/or in response to activation or fueling of a previously deactivated or non-fueled primary EGR cylinder b.

Non-limiting examples of events resulting in EGR fraction deviation condition 218 causing an EGR fraction overshoot condition include, for example, an accelerator tip-out condition determined from accelerator pedal position 210, transient conditions during engine operation determined from engine operating conditions 208, and/or a steady state low load condition of operation of engine 102. An accelerator tip-out condition can result in an excess EGR flow due to excess exhaust gas accumulated in the EGR system 101 and the inability to change pressure in EGR passage 109 as quickly as the pressure in intake manifold 105 in response to the accelerator tip-out condition. Engine operating conditions 208 can include a change in engine speed, change in engine torque output, a torque request change, an intake manifold pressure and/or temperature, an exhaust manifold pressure and/or temperature, or any other condition suitable to indicate an EGR flow or expected change in the EGR flow. A steady state condition low load condition (less than 50% of maximum torque output of engine 102, for example) can result in an excess EGR flow due to internal residuals or internal EGR flow in primary EGR cylinders b that occur due to volumetric efficiency changes.

Controller apparatus 200 is operable to interpret an EGR fraction deviation condition 218 in response to determining a deviation of an actual EGR fraction 214 from the expected EGR fraction 216 in response to determining the EGR flow, determining an accelerator tip-out condition, determining a steady state low load condition, and combinations of these. The actual EGR fraction 214 can be determined from engine operating conditions 208 that include, for example, by direct measurement of EGR flow 108, a determination and a comparison of a mass air flow rate at the intake manifold 105 to a fresh air flow rate, a comparison of oxygen amounts in the EGR flow passage 109 and the exhaust manifold 130 of the non-primary EGR cylinders a, or other suitable measurement or determination technique.

Referencing further to FIG. 1, system 100 allows for regulation or mitigation of the EGR fraction deviation condition 218 that is an EGR overshoot condition by an EGR fraction deviation mitigation command 220 that controls the EGR flow 108 through coordinating bleed-off of EGR flow from the EGR passage 109 and/or an exhaust manifold 109a of one or more primary EGR cylinders b to one of an inlet of compressor 120 or the inlet of catalyst 138. An intake bleed-off passage 160 is provided between the EGR passage 109 and intake passage 104 upstream of or at the inlet of compressor 120, which is also upstream of the mixing location of EGR flow 108 from EGR passage 109 and intake flow 118 of intake passage 104. As a result, the outlet of intake bleed-off passage 160 is at a lower pressure region of the intake system 113 than the outlet of EGR passage 109. When a pop-off or dump valve 162 is opened in response to an EGR fraction deviation condition mitigation command 220 from controller apparatus 200, the pressure in EGR passage 109 is reduced, which reduces the EGR flow 108 to intake system 113 and reduces or maintains the actual EGR fraction 214 toward or at the expected EGR fraction 216.

In an another embodiment, an exhaust bleed-off passage 170 is alternatively or additionally provided between EGR passage 109 and an inlet to or upstream of catalyst 138, which is downstream of turbine 134. The outlet of exhaust bleed-off passage 170 is at a lower pressure condition than the mixing location of EGR passage 109 and intake passage 104. When a pop-off or dump valve 172 is opened in response to an EGR fraction deviation condition mitigation command 220 from controller apparatus 200, the pressure in EGR passage 109 is reduced, which reduces the EGR flow 108 to drive or maintain the actual EGR fraction 214 toward or at the expected EGR fraction 216. Actuation of valve 172 can be coordinated with operating non-primary EGR cylinders a at a lean condition to maintain stoichiometric conditions at catalyst 138. In addition, storage capabilities can be added to catalyst 138 to accommodate short term EGR fraction overshoot conditions and temporary excursions from stoichiometric conditions.

Valves 162, 172 can include an actuator that is electronically controlled in response to EGR fraction deviation condition mitigation command 220 from controller apparatus 200. In other embodiments, valves 162, 172 can be controlled mechanically to open in response to pressure conditions in EGR passage 109 exceeding a predetermined threshold. Valves 162, 172 can be binary, with open-closed positions only, and/or continuously variable valves controllable to one or more positions between open and closed positions.

Figure 3:
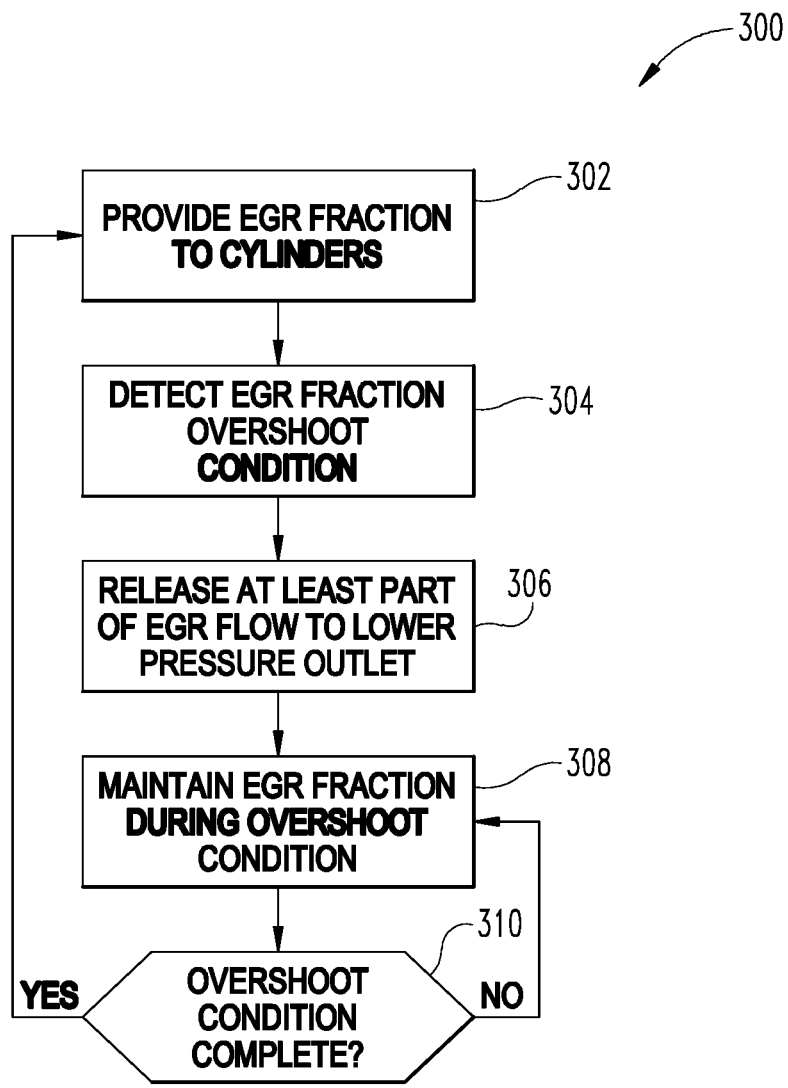
FIG. 3 is a flow diagram of a procedure for controlling EGR flow in the EGR loop in response to a transient condition.

Referring to FIG. 3, a procedure 300 includes an operation 302 to provide an EGR fraction to cylinders a, b through an EGR flow produced by primary EGR cylinders b. Procedure 300 further includes an operation 304 to detect an EGR fraction deviation condition such as an EGR fraction overshoot condition that results, for example, due to a transient condition. In response to determining the EGR fraction overshoot condition, procedure 300 continues at operation 306 to release or direct at least a part of the EGR flow 109 to a lower pressure outlet, such as at the inlet of the compressor 120 in the intake system, or at the inlet of a catalyst 138 in the exhaust system, or to both the intake system and the exhaust system, such as to a first second location at the inlet of compressor 120 and to a second secondary location at the inlet of catalyst 138. Procedure 300 continues at operation 308 to maintain or drive the EGR fraction during the overshoot condition toward the expected EGR fraction. At conditional 310, it is determined if the EGR fraction overshoot condition is complete. If conditional 310 is negative, procedure 300 returns to operation 308 to maintain or drive the EGR fraction during the EGR fraction overshoot condition at or toward the expected EGR fraction. If conditional 310 is positive, procedure 300 returns to operation 302 to provide EGR flow at the EGR fraction through EGR passage 109 without redirecting or releasing EGR flow to a lower pressure outlet.

As is evident from the foregoing description, a number of aspects of the systems, methods and apparatus are contemplated. According to one aspect, a system includes an internal combustion engine having at least one primary EGR cylinder connected to an EGR passage and a plurality of non-primary EGR cylinders connected to an exhaust passage. The EGR passage is connected to an intake system to provide an EGR flow from the at least one primary EGR cylinder to the intake system. The intake system provides a charge flow to the at least one primary EGR cylinder and the plurality of non-primary EGR cylinders, and the charge flow includes an EGR fraction corresponding to an expected EGR flow from the at least one primary EGR cylinder. The system also includes a controller structured to interpret an EGR fraction deviation condition, and in response to the EGR fraction deviation condition, to divert at least a portion of the EGR flow to a secondary location in at least one of the intake system and the exhaust passage that is lower in pressure than the connection of the EGR passage to the intake system.

In one embodiment, the secondary location is at an inlet to a compressor in the intake system, and the compressor is upstream of the connection of the EGR passage to the intake system. In another embodiment, the secondary location is at an inlet to a catalyst of the exhaust passage. In a refinement of this embodiment, the exhaust passage includes a turbine upstream of the catalyst.

In another embodiment, the secondary location is connected to the EGR passage with an EGR flow diversion passage. In a refinement of this embodiment, the EGR flow diversion passage includes one of a dump valve and a pop off valve that is opened in response to the EGR fraction deviation condition mitigation command. In another embodiment, the EGR fraction deviation condition is an EGR fraction overshoot condition.

In another embodiment, the at least one primary EGR cylinder includes two primary EGR cylinders. In a further embodiment, the controller is configured to fuel the plurality of non-primary EGR cylinders at a lean air-to-fuel ratio in response to the EGR fraction deviation condition mitigation command diverting EGR flow to the secondary location, and the secondary location is an inlet to a catalyst in the exhaust passage. In yet another embodiment, the secondary location includes a first secondary location in the intake system and a second secondary location in the exhaust system.

According to another aspect, a method includes producing an exhaust flow from an internal combustion engine having at least one primary EGR cylinder connected to an EGR passage and a plurality of non-primary EGR cylinders connected to an exhaust system; passing the exhaust flow from the non-primary EGR cylinders through the exhaust system to atmosphere; recirculating exhaust flow from the at least one primary EGR cylinder to provide an EGR flow to an intake system, the charge flow including an EGR fraction corresponding to an amount of EGR flow from the at least one primary EGR cylinder in the charge flow; determining an EGR fraction deviation condition in the charge flow to the plurality of non-primary EGR cylinders and the at least one primary EGR cylinder; and in response to determining the EGR fraction deviation condition, mitigating the EGR fraction deviation condition by diverting at least a portion of the EGR flow to a secondary location in at least one of the intake system and the exhaust system that is lower in pressure than a connection of the EGR passage to the intake system.

In one embodiment of the method, the secondary location is at an inlet to a compressor of the intake system, and the compressor is upstream of the connection of the EGR passage to the intake system. In another embodiment, the secondary location is at an inlet to a catalyst in the exhaust system. In another embodiment of the method, the secondary location is connected to the EGR passage with an EGR flow diversion passage. In a refinement of this embodiment, the EGR fraction deviation condition is an EGR fraction overshoot condition in which an actual EGR fraction exceeds an expected EGR fraction, and the method includes opening one of a dump valve and a pop off valve in the EGR flow diversion passage in response to determining the EGR fraction deviation condition.

In another embodiment, the at least one primary EGR cylinder includes two primary EGR cylinders. In yet another embodiment, the EGR fraction deviation condition is an EGR fraction overshoot condition in which an actual EGR fraction exceeds an expected EGR fraction and the secondary location is an inlet to a catalyst in the exhaust system, and the method includes fueling the plurality of non-primary EGR cylinders at a lean air-to-fuel ratio in response to determining the EGR fraction overshoot condition. In another embodiment of the method, determining the EGR fraction deviation condition includes determining a deviation of an actual EGR fraction in the charge flow from an expected EGR fraction. In yet another embodiment of the method, determining the EGR fraction overshoot condition includes detecting an accelerator tip-out condition. In another embodiment, the secondary location includes a first secondary location in the intake system and a second secondary location in the exhaust system.

According to another aspect, an apparatus includes an internal combustion engine including a plurality of cylinders. At least one of the plurality of cylinders is a primary EGR cylinder connected to an intake system to provide an EGR flow that mixes with an intake flow to form a charge flow to the plurality of cylinders, and remaining ones of the plurality of cylinders being connected to an exhaust system to provide an exhaust flow to an after treatment component of the exhaust system. The apparatus also includes a controller with an EGR fraction determination module structured to determine an actual EGR fraction in the charge flow, an EGR fraction deviation condition module structured to determine an EGR fraction deviation condition in response to the actual EGR fraction and an expected EGR fraction, and an EGR fraction deviation condition mitigation module structured to output an EGR fraction deviation mitigation command in response to the EGR fraction deviation condition. The EGR fraction deviation command is operable to control a valve to divert at least a portion of the EGR flow to a secondary location in at least one of the intake system and the exhaust system that is lower in pressure than a mixing location of the EGR flow with the intake flow.

In one embodiment, the EGR fraction deviation condition module is structured to determine an EGR fraction overshoot condition in response to the actual EGR fraction exceeding the expected EGR fraction. In another embodiment, the valve is located in a diversion passage connecting the secondary location with EGR flow upstream of the mixing location. In yet another embodiment, the EGR fraction deviation condition module is structured to determine the actual EGR fraction in response to at least one of an EGR flow and an accelerator tip-in condition.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system comprising:
   an internal combustion engine having at least one primary exhaust gas recirculation (EGR) cylinder connected to an EGR passage and a plurality of non-primary EGR cylinders connected to an exhaust passage, and a turbine operatively connected to a compressor;
   wherein the EGR passage is connected to an intake system to provide an EGR flow from the at least one primary EGR cylinder to the intake system;
   wherein the intake system provides a charge flow to the at least one primary EGR cylinder and the plurality of non-primary EGR cylinders, the charge flow including an EGR fraction corresponding to an expected EGR flow from the at least one primary EGR cylinder; and
   a controller operably connected to the internal combustion engine, the controller including a non-transitory computer readable medium with executable instructions to determine an EGR fraction deviation condition and to divert at least a portion of the EGR flow to a secondary location via regulating a valve in response to the EGR fraction deviation condition;
   wherein the secondary location is positioned at an inlet to at least one of the compressor in the intake system and to a catalyst in the exhaust passage and is lower in pressure than a primary location defined as a connection of the EGR passage to the intake system.

2. The system of claim 1, wherein the secondary location is at the inlet to the compressor of the intake system, wherein the compressor is upstream of the connection of the EGR passage to the intake system.

3. The system of claim 1, wherein the secondary location is at the inlet to the catalyst in the exhaust passage.

4. The system of claim 3, wherein the exhaust passage includes the turbine upstream of the catalyst.

5. The system of claim 1, wherein the secondary location is connected to the EGR passage with an EGR flow diversion passage.

6. The system of claim 5, wherein the EGR flow diversion passage includes one of a dump valve and a pop off valve that is opened in response to the EGR fraction deviation condition mitigation command.

7. The system of claim 1, wherein the EGR fraction deviation condition is an EGR fraction overshoot condition.

8. The system of claim 1, wherein the at least one primary EGR cylinder includes two primary EGR cylinders.

9. The system of claim 1, wherein the controller is configured further comprising executable instructions to fuel the plurality of non-primary EGR cylinders at a lean air-to-fuel ratio in response to the EGR fraction deviation condition mitigation command diverting EGR flow to the secondary location, wherein the secondary location is the inlet to the catalyst in the exhaust passage.

10. The system of claim 1, wherein the secondary location includes a first secondary location in the intake system and a second secondary location in the exhaust passage.

11. A method of controlling an exhaust gas recirculation flow in an internal combustion engine having at least one primary exhaust gas recirculation (EGR) cylinder connected to an EGR passage and a plurality of non-primary EGR cylinders connected to an exhaust system, and a turbine operatively connected to a compressor, comprising:
   passing the exhaust flow from the non-primary EGR cylinders through the exhaust system to atmosphere;
   recirculating exhaust flow from the at least one primary EGR cylinder through the EGR passage to an intake system, the intake system providing a charge flow including an EGR fraction corresponding to an amount of EGR flow from the at least one primary EGR cylinder in the charge flow;
   during a transient operating condition of the internal combustion engine,
      determining with the controller an EGR fraction deviation condition in the charge flow to the plurality of non-primary EGR cylinders and the at least one primary EGR cylinder;
      mitigating the EGR fraction deviation condition whether the EGR flow is in an overshoot condition with the controller; and
      adjusting a valve to divert at least a portion of the EGR flow to a secondary location in response to determining the EGR fraction deviation condition;
      wherein the secondary location is positioned at an inlet to at least one of the compressor in the intake system and to a catalyst in the exhaust system and is lower in pressure than a primary location defined as a connection of the EGR passage to the intake system.

12. The method of claim 11, wherein the adjusting the valve to divert at least a portion of the EGR flow to the secondary location includes the secondary location is at the inlet to the compressor of the intake system, wherein the compressor is upstream of the connection of the EGR passage to the intake system.

13. The method of claim 11, wherein the adjusting the valve to divert at least a portion of the EGR flow to the secondary location includes the secondary location is at the inlet to the catalyst in the exhaust system.

14. The method of claim 11, wherein the adjusting the valve to divert at least a portion of the EGR flow to the secondary location includes the secondary location is connected to the EGR passage with an EGR flow diversion passage.

15. The method of claim 14, wherein the EGR fraction deviation condition is an EGR fraction overshoot condition in which an actual EGR fraction exceeds an expected EGR fraction, and further comprising opening one of a dump valve and a pop off valve in the EGR flow diversion passage in response to determining the EGR fraction deviation condition.

16. The method of claim 11, wherein the at least one primary EGR cylinder includes two primary EGR cylinders.

17. The method of claim 11, wherein the EGR fraction deviation condition is an EGR fraction overshoot condition in which an actual EGR fraction exceeds an expected EGR fraction and the secondary location is at the inlet to the catalyst in the exhaust system, and further comprising fueling the plurality of non-primary EGR cylinders at a lean air-to-fuel ratio in response to determining the EGR fraction overshoot condition.

18. The method of claim 11, wherein determining the EGR fraction deviation condition includes detecting an accelerator tip-out condition.

19. The system of claim 11, wherein the adjusting the valve to divert at least a portion of the EGR flow to the secondary location includes the secondary location having a first secondary location in the intake system and a second secondary location in the exhaust system.

20. An apparatus, comprising:
an internal combustion engine including a plurality of cylinders, at least one of the plurality of cylinders being a primary exhaust gas recirculation (EGR) cylinder connected to an intake system to provide an EGR flow that mixes with an intake flow to form a charge flow to the plurality of cylinders, and remaining ones of the plurality of cylinders being connected to an exhaust system to provide an exhaust flow to an after treatment device of the exhaust system, and a turbine operatively connected to a compressor;
a controller comprising:
an EGR fraction determination module determining an actual EGR fraction in the charge flow;
an EGR fraction deviation condition module determining an EGR fraction deviation condition in response to the actual EGR fraction and an expected EGR fraction; and
an EGR fraction deviation condition mitigation module outputting an EGR fraction deviation mitigation command in response to the EGR fraction deviation condition, wherein the EGR fraction deviation command is operable to control a valve to divert at least a portion of the EGR flow to a secondary location, wherein the secondary location is positioned at an inlet to at least one of the compressor in the intake system and to the after treatment device being downstream of the turbine in the exhaust system and is lower in pressure than a mixing location of the EGR flow with the intake flow.

21. The apparatus of claim 20, wherein the EGR fraction deviation condition module determining an EGR fraction overshoot condition in response to the actual EGR fraction exceeding the expected EGR fraction.

22. The apparatus of claim 20, wherein the valve is located in a diversion passage connecting the secondary location with EGR flow upstream of the mixing location.

23. The apparatus of claim 20, wherein the EGR fraction deviation condition module determining the actual EGR fraction in response to at least one of an EGR flow and an accelerator tip-in condition.

* * * * *